July 2, 1929.  H. B. TEFFT  1,719,204
STORAGE BATTERY AND PROCESS FOR MAKING SAME
Filed Dec. 23, 1922
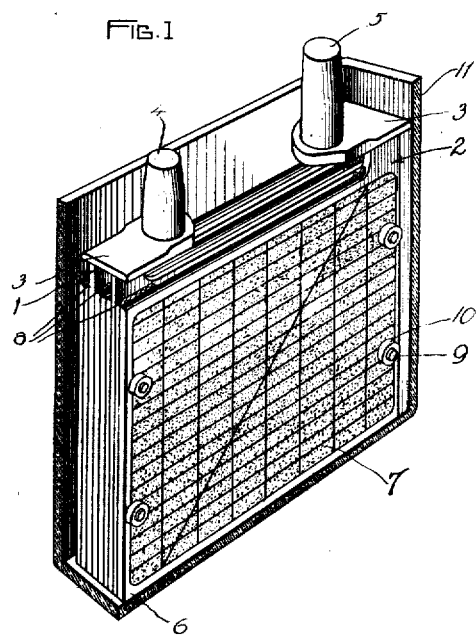
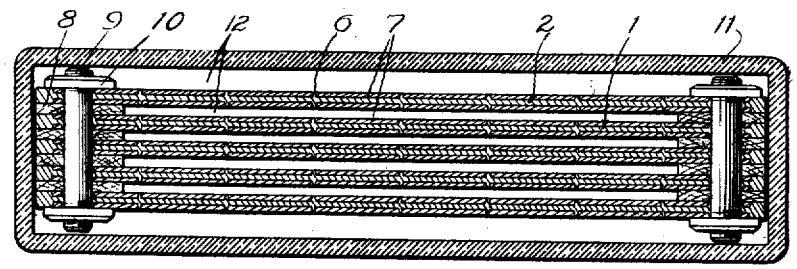
INVENTOR
HENRY B. TEFFT
By Chindahl Parker & Carlson
ATTYS.

Patented July 2, 1929.

1,719,204

UNITED STATES PATENT OFFICE.

HENRY B. TEFFT, OF CHICAGO, ILLINOIS; ALICE TEFFT BUEDEL ADMINISTRATRIX OF SAID TEFFT, DECEASED, ASSIGNOR TO HARRY C. McNAMER, OF CHICAGO, ILLINOIS.

STORAGE BATTERY AND PROCESS FOR MAKING SAME.

Application filed December 23, 1922. Serial No. 608,616.

The invention relates to an improved storage battery, and to the process employed in its manufacture.

The primary object of the invention is to provide a storage battery which will not short circuit within the cells.

The most serious troubles commonly encountered in prior lead storage batteries are sulphation, short-circuiting between plates, local action, buckling, and disintegration. Another object of the invention, therefore, is to provide a storage battery in which the above mentioned troubles will be greatly reduced if not practically eliminated.

A further object is to provide a storage battery which can be discharged far below the point recognized in general practice as the safe minimum without producing excessive sulphation or other injury; which can be recharged within a relatively short time even through the battery may have been very much run down; and which may be overcharged for a long period of time without being injured, provided the current is low enough to avoid excessive heating.

Another object is to provide a storage battery which has a low internal electrical resistance and a high discharge potential.

A further object is to provide a lead storage battery which is made by grouping the plates before forming; by combining the forming and initial charging operations; and by performing the combined operation within less time than is usually required in the manufacture of prior batteries of this type for either the forming or the initial charging operation.

In prior batteries of the above type it is necessary to insert insulators, such as glass tubes, chemically prepared wooden or perforated hard rubber sheets, between the lead plates to prevent short circuiting within the cells. Another important object is to provide a storage battery in which such insulators may be dispensed with, thereby reducing the cell resistance, and allowing a better circulation of the electrolyte.

A further object is to provide a storage battery in which the positive and negative plates are uniformly separated by spacers, and are rigidly bolted together.

Another object is to provide a storage battery having an electrolyte containing, instead of the usual distilled water, river, lake or other suitable water, into which small amounts of gold, silver, lead, or other suitable metals have been brought into solution.

Further objects and advantages will become apparent as the description proceeds.

In the accompanying drawings, Figure 1 is a perspective view of a lead storage battery which has been made in accordance with my invention and which embodies the novel features resulting therefrom. Fig. 2 is a horizontal sectional view.

I have departed radically from the general practice of storage battery construction and manufacture as followed by those skilled in the art, and have thereby eliminated or minimized many of the prevalent troubles encountered therein.

In prior storage batteries now in commercial use, insulators comprising chemically prepared wooden sheets, perforated hard rubber sheets, or glass tubes must be positioned between the adjacent plates to prevent an undue amount of short circuiting. Such insulators are objectionable since they obstruct the free and uniform passage of current, hinder the circulation of the electrolyte, increase sulphation, local action, and buckling, and add materially to the cost of the battery. Such insulators are also unsatisfactory in that they frequently fail to prevent short circuiting, as for example, when active material falls against perforations in the insulators or when sediment collects at the bottom of the battery container. When the batteries become old, the insulators deteriorate and break down, thereby causing unequal current density and increased short circuiting within the cells. Many efforts have been made to discover improved insulators which will avoid the above difficulties but without avail.

I have provided an improved storage battery which will not short circuit for reasons to be subsequently explained, and in which all insulators between the plates may be dispensed with. The free space between the plates allows a better circulation of the electrolyte thereby increasing the battery voltage, cell efficiency, and rate of charge and discharge. Sulphation, local action, and buckling are greatly reduced, while the cost of the battery is materially decreased.

I make the electrolyte for the battery by forcing a heavy electric arc from a mass of submerged metallic ore through the water, and then mixing the prepared water with commercial sulphuric acid in suitable proportions. Lake, river or hydrant water containing no iron or deleterious salt is preferably used. Distilled water need not be used in refilling the battery when in use.

Prior practice prescribes that the plates be formed before they are grouped, thereby necessitating a separate initial charging operation after grouping. In my battery the curing and initial charging are effected simultaneously by the same current, after grouping, thereby reducing the time and cost of manufacture. The positive and negative plates are rigidly bolted together thus reducing the possibility of buckling and disintegration, and maintaining an invariable spacing.

In the drawings, 1 indicates the positive plates, and 2 the negative plates of the storage battery, each of the above sets of plates being connected by cross bars 3 to positive and negative terminal posts 4 and 5, respectively. The plates comprise lead-antimony grids 6 which support the active material 7 in their interstices. Narrow spacers 8 made of wood or other suitable material and positioned between the side ends of the adjacent plates, maintain a proper uniform distance therebetween. The plates and spacers are held in rigid relation by bolts 9 made of hard rubber or other suitable material and threaded at their opposite ends to receive nuts 10. The parts thus assembled are retained as a unit within a suitable vessel or jar 11 containing a novel electrolyte 12.

To make the improved electrolyte 12, a one-half inch layer or more of rich metallic ore, such as gold, silver or lead ore, in its natural state, is placed in the bottom of a suitable receptacle and covered with several inches of river, lake, or well water. The water must be free from iron and deleterious salts. Preferably the negative lead of a high potential circuit is now made to contact with the ore, while the positive lead is positioned about one inch above the surface of the water. An induction coil, the primary side of which is connected to a six to eight volt storage battery, may be used. From twenty thousand to sixty thousand volts are now impressed across the free terminals in the receptacle for a period of about forty-five minutes. A continuous arc will thereby be established between the positive lead wire and the surface of the water, and will cause certain amounts of the ore to go into solution. The water should be gently agitated during the process. The prepared water is now removed from the receptacle. Since very little metal is needed in solution, the process may be made continuous. After the water has been treated, commercial sulphuric acid is added until the specific gravity of the solution equals 1.175. The electrolyte is now ready for use.

To make the paste for the positive grids, four parts of dry red lead are thoroughly mixed with two parts of litharge. The specific gravity of a portion of the above electrolyte is reduced to 1.1 by the addition of prepared water. Enough low specific gravity electrolyte is then added to the mixture of red lead and litharge to obtain a stiff paste. The specific gravity of the electrolyte is reduced to lower the amount of heat which is given off in the mixing operation. The paste is thoroughly and quickly stirred, and then spread out to cool. After cooling, it is ground until a stiff plastic putty results. Thorough mixing and grinding is important, and must not be done when the materials are warm. The paste is now ready to be applied to the grids.

In making the paste for the negative grids two and one-third parts of red lead are mixed with four parts of litharge. In other respects, the process is the same as for the positive paste.

The grids are now carefully and evenly filled with the proper paste, and then placed on edge to dry. The freshly prepared plates must not be dried too fast, or shrinking cracks will result.

When dry the plates and wooden spacers are assembled and securely bolted together by the hard rubber bolts, whereby permanent rigidity is obtained. Buckling is prevented and a permanent uniform distance between the plates is maintained, thereby resulting in a uniform voltage and an improved circulation of the electrolyte. The grouped plates are placed within the battery vessel or container 11, and electrolyte having a specific gravity of 1.14 added. The battery is now ready for initial curing and charging.

The battery is charged with a current of ten to twelve amperes for twenty-two hours, and is then discharged at a current not greater than fifty amperes. The rate at which forming and charging proceeds is so rapid that after the first five minutes sufficient electrical energy is stored in a battery of three cells to brightly light a nine volt lamp for five minutes. After being discharged, the battery is cleaned out, and new electrolyte having a specific gravity of 1.175 added. The battery is again charged at the above rate, after which it is ready for use.

In the curing and charging operation, the positive plates turn black and the negative plates turn gray or coin silver in color. As the battery is repeatedly recharged and discharged in use, the black material on the positive plates increases in amount. The battery can be overcharged or overdischarged without being materially injured, and can be recharged within seven and one-half to nine hours even though very much run down. Distilled or rain water should not be used in making the electrolyte, or in refilling the battery when in use.

I have provided an efficient lead storage battery which is cheap to manufacture and simple in construction, which is strong and long-lived, and which avoids many of the defects and troubles common in prior storage batteries. While I have illustrated a preferred embodiment of my invention with considerable particularity it should be understood that various changes may be made without departing from the spirit and scope of the invention as expressed in the appended claims.

I claim as my invention:

1. The process of making a storage battery comprising submerging metallic ore in undistilled water, sending an electric current by means of a high impressed voltage through said ore and water, mixing said prepared water with sulphuric acid, mixing some of said acid solution with red lead and litharge to form a paste, applying said paste to lead grids to form plates, drying said plates, assembling the positive and negative plates, immersing said plates in some of said acid solution, charging said plates at a low rate, discharging said plates at a high rate, replacing said acid solution surrounding said plates with fresh solution, and recharging said plates.

2. The process of making a storage battery comprising submerging metal in undistilled water, sending an electric current by means of a high impressed voltage through said metal and said water, mixing said prepared water with sulphuric acid, immersing the positive and negative plates for a lead storage battery in said acid solution, charging said plates at a low rate, discharging said plates at a high rate, replacing the acid solution surrounding said plates with new solution, and recharging said plates.

3. The process of forming and charging a storage battery comprising immersing the plates for the battery in an electrolyte containing a metal, charging said plates, discharging said plates, immersing said plates in fresh electrolyte containing a metal, and recharging said plates.

4. The process of forming and charging a storage battery comprising immersing the plates for the battery in an electrolyte containing a metal and having a low specific gravity, charging and discharging said plates, immersing said battery plates in fresh electrolyte having a higher specific gravity, and recharging said plates.

5. The process of making a storage battery comprising applying a paste of red lead and litharge upon grids to form battery plates, drying said plates, assembling and immersing said plates in an electrolyte containing a metal and sending a current through said immersed plates to simultaneously effect a forming and initial charging thereof.

6. The process of charging a storage battery comprising immersing the plates for the battery in an electrolyte containing a metal, and charging said plates.

7. A storage battery having, in combination, a jar, an electrolyte prepared from undistilled water and metallic ore by sending a heavy current therethrough, and plates in said electrolyte.

8. A storage battery having, in combination, a jar, an electrolyte containing a metal in said jar, and battery plates immersed in said electrolyte.

9. A storage battery having plates, the active material of which has been subject to the action of an electrolyte containing sulphuric acid and traces of metal.

10. The process of making an electrolyte for a storage battery comprising immersing a metallic ore in undistilled water, sending a current by means of a high impressed voltage through said ore and said water, and mixing said prepared water with sulphuric acid.

11. The process of making an electrolyte for a storage battery comprising submerging a metal in undistilled water, connecting said metal to one terminal of an electric circuit, placing the other terminal of said electric circuit just above the the surface of said water so as to obtain an electric arc, and mixing said prepared water with sulphuric acid.

12. The process of making an electrolyte for a storage battery comprising immersing in water, sending a current through said metal and said water, and mixing said prepared water with sulphuric acid.

13. In the process of making an electrolyte for a storage battery, the step of sending a current through water and immersed metal.

14. An electrolyte for a storage battery comprising, in combination, undistilled water containing traces of gold and silver in solution, and sulphuric acid.

15. An electrolyte for a storage battery comprising, in combination, water containing traces of metal, and sulphuric acid.

16. An electrolyte for a storage battery containing traces of gold, silver, and lead in solution.

17. An electrolyte for a storage battery comprising, in combination, water into which a metal has been brought into solution by the passage of an electric arc, and sulphuric acid.

18. An electrolyte for a storage battery containing metal.

19. An electrolyte for a storage battery containing a metal of high conductivity.

20. The process of making paste for storage battery plates, comprising, mixing red lead and litharge dry, immersing metallic ore in undistilled water, sending an electric current by means of a high impressed voltage through said ore and said water, mixing said prepared water with sulphuric acid, adding said acid solution to said mixture of red lead and litharge to form a paste, cooling said paste, and rigidly grinding said cooled paste to form a stiff paste.

21. The process of making paste for storage battery plates comprising mixing red lead and litharge dry, immersing a metal in water, sending a current through said water, said metal being connected to one terminal of said circuit, mixing said prepared water with acid, mixing said acid solution and said mixture of red lead and litharge to form a paste, cooling said paste, and grinding said cooled paste.

22. The process of making paste for storage battery plates comprising mixing a liquid containing traces of metal with oxides of lead.

23. A paste for storage battery plates comprising, in combination, a mixture of oxides of lead, and a liquid containing traces of metal.

24. A paste for storage battery plates made by mixing red lead and litharge with a liquid containing sulphuric acid and traces of metal.

In testimony whereof, I have hereunto affixed my signature.

HENRY B. TEFFT.

CERTIFICATE OF CORRECTION.

Patent No. 1,719,204.                               Granted July 2, 1929, to

ALICE TEFFT BUEDEL, Administratrix of HENRY B. TEFFT, deceased.

It is hereby certified that error appears in the printed specification of the above numbered patent requiring correction as follows: Page 1, line 21, for the word "through" read "though"; page 3, line 34, claim 2, after the word "submerging" insert the words "a substance containing"; same page, line 100, claim 12, after the word "immersing" insert the word "metal"; and that the said Letters Patent should be read with these corrections therein that the same may conform to the record of the case in the Patent Office.

Signed and sealed this 13th day of August, A. D. 1929.

(Seal.)

M. J. Moore,
Acting Commissioner of Patents.

water with sulphuric acid, adding said acid solution to said mixture of red lead and litharge to form a paste, cooling said paste, and rigidly grinding said cooled paste to form a stiff paste.

21. The process of making paste for storage battery plates comprising mixing red lead and litharge dry, immersing a metal in water, sending a current through said water, said metal being connected to one terminal of said circuit, mixing said prepared water with acid, mixing said acid solution and said mixture of red lead and litharge to form a paste, cooling said paste, and grinding said cooled paste.

22. The process of making paste for storage battery plates comprising mixing a liquid containing traces of metal with oxides of lead.

23. A paste for storage battery plates comprising, in combination, a mixture of oxides of lead, and a liquid containing traces of metal.

24. A paste for storage battery plates made by mixing red lead and litharge with a liquid containing sulphuric acid and traces of metal.

In testimony whereof, I have hereunto affixed my signature.

HENRY B. TEFFT.

CERTIFICATE OF CORRECTION.

Patent No. 1,719,204.  Granted July 2, 1929, to

ALICE TEFFT BUEDEL, Administratrix of HENRY B. TEFFT, deceased.

It is hereby certified that error appears in the printed specification of the above numbered patent requiring correction as follows: Page 1, line 21, for the word "through" read "though"; page 3, line 34, claim 2, after the word "submerging" insert the words "a substance containing"; same page, line 100, claim 12, after the word "immersing" insert the word "metal"; and that the said Letters Patent should be read with these corrections therein that the same may conform to the record of the case in the Patent Office.

Signed and sealed this 13th day of August, A. D. 1929.

(Seal.)

M. J. Moore,
Acting Commissioner of Patents.